United States Patent [19]

Mörner et al.

[11] Patent Number: 4,460,072
[45] Date of Patent: Jul. 17, 1984

[54] BRAKING MECHANISM FOR BRAKING THE CHAIN OF A PORTABLE POWER CHAIN SAW

[75] Inventors: Bengt O. J. S. Mörner, Hovås, Sweden; Peter Thomsen, Quickborn, Fed. Rep. of Germany

[73] Assignee: Firma Sachs Dolmar GmbH & Co., Hamburg, Fed. Rep. of Germany

[21] Appl. No.: 282,604

[22] Filed: Jul. 13, 1981

[30] Foreign Application Priority Data

Jul. 18, 1980 [DE] Fed. Rep. of Germany ....... 3027221

[51] Int. Cl.³ .................. F16D 51/00; G05G 1/04
[52] U.S. Cl. .................................. 188/77 R; 74/520
[58] Field of Search ............. 30/381, 382, 383, 384; 192/17 R, 17 A, 17 C, 17 D; 74/519, 520, 106; 188/77 R, 77 W, 166, 140 A

[56] References Cited

U.S. PATENT DOCUMENTS 2,854,858 10/1958 Butterfield et al. ............. 188/77 R
2,910,147 10/1959 Fishtahler et al. .................... 74/520

FOREIGN PATENT DOCUMENTS 707 of 1911 United Kingdom ............ 188/77 R

*Primary Examiner*—Bruce H. Stoner, Jr.
*Assistant Examiner*—Robert Oberleitner
*Attorney, Agent, or Firm*—Toren, McGeady and Stanger

[57] ABSTRACT

The invention relates to a braking mechanism for braking the chain of a portable power chain saw when a hazardous state occurs. The operating lever rotatably mounted on the chain saw casing is in operative connection with a control lever acting on a brake band by means of a lever-like device. Thus, in the braking position the control lever is transferred into an angular position with a simultaneous position change of the two brake band articulation points. As a result, the brake band is applied to the brake drum, which ensures that the braking mechanisms act without any delay.

5 Claims, 9 Drawing Figures

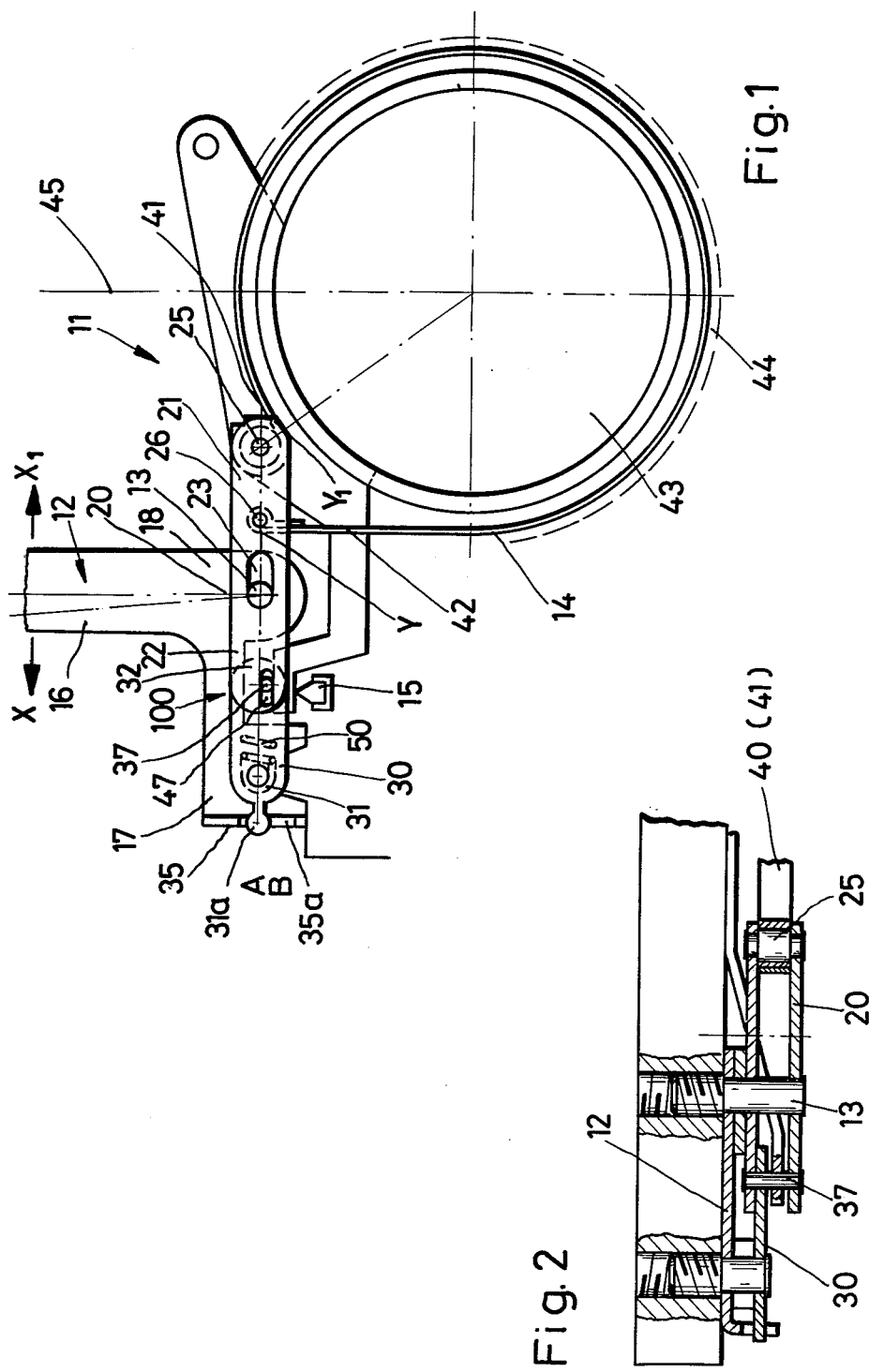

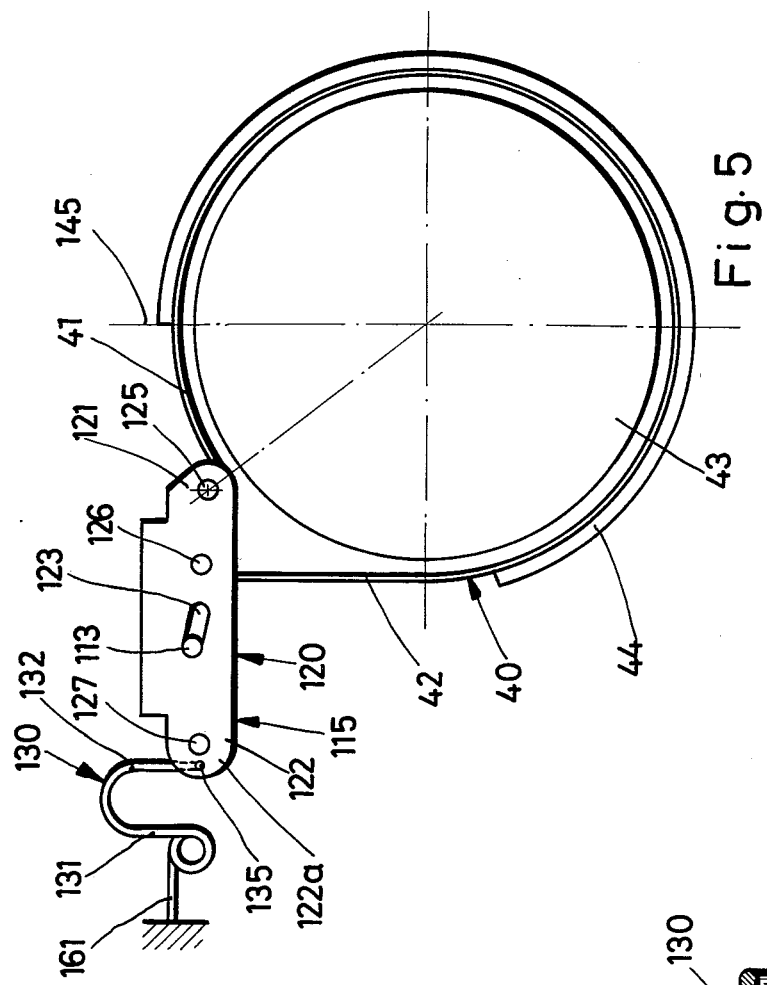

BRAKING MECHANISM FOR BRAKING THE CHAIN OF A PORTABLE POWER CHAIN SAW

BACKGROUND OF THE INVENTION

The present invention relates to a braking mechanism for braking the chain of a portable power chain saw having a sensor which responds when a hazardous state occurs and which is constructed as a pivotable frame or operating lever mounted on the chain saw casing which can come into contact with one hand of the saw operator in the case of a swinging movement of the saw and by the movement of which it is possible to operate a friction brake in operative connection with the frame or operating lever and which acts on a drum connected to the driving sprocket of the chain.

Swinging movements can easily occur with portable power chain saws if the part of the chain passing over the top of the braking plate comes into contact with a solid object, i.e. a branch. As a result of the possible swinging up of the saw, it is possible for the saw operator to be injured in the face or the upper part of the body if he releases the front, bow-shaped handle of the saw. To prevent this, protective means are known which serve to brake the saw in the case of a sudden swinging movement thereof.

The use of pawl-like release mechanisms are known for releasing the braking devices for braking the chain of portable power chain saws. Thus, a braking mechanism for power saws is known which has single-bar ratchet levers, pivotably mounted on one side and joined to a tension spring and the brake band and enclosing the drum of the driving sprocket. The disadvantage of this known braking mechanism is that a relatively large amount of force is required for disengaging the pawl on the ratchet lever. As a result, there is a risk of a delay in the braking mechanism operating, so that an adequate protection for the saw operator is not ensured (DOS No. 2,217,707, and DOS No. 2,440,483).

In addition, a braking mechanism is known in which a release frame is provided onto which is shaped a cam, which can be engaged on the stop member of an actuating element. This actuating element is subject to the action of a spring and is connected to the free terminal portion of the brake band. However, in the case of this braking mechanism, vibrations and shocks, such as occur in the normal operation of the saw, are transmitted to the release frame and consequently easily lead to the connection with the operating element being broken. Thus, particularly when sawing knotty wood and the like, it can easily occur that the braking mechanism is released without there being any hazardous state, so that a braking mechanism constructed in this way impairs the sawing capacity of the saw operator (U.S. Pat. No. 3,982,616, DOS No. 2,459,528).

In addition, a braking mechanism is known, which has the disadvantage of a complicated and costly construction due to the use of a two-arm lever. Furthermore, the swinging movements of the saw blade, which even occur during the normal operation of the saw, are directly transmitted via the levers to the braking mechanism, so that the latter can function without there being any danger to the saw operator (DOS No. 2,621,812).

BRIEF SUMMARY OF THE INVENTION

The problem of the present invention is to provide a braking mechanism for the chains of portable power chain saws, which acts without delay if a dangerous state occurs, so-called recoil, which only functions when the saw operator is in danger, which ensures completely satisfactory braking and which after braking has taken place, ensures that the actual braking system is freely movable without any further control by the control lever.

According to the invention, this problem is solved by a braking mechanism for braking the chain of a portable power chain saw according to the type defined hereinbefore, which is characterized in that the rotatably mounted operating lever on the casing of the chain saw is connected by means of a lever-like device with an operating lever on whose free end are rotatably articulated in spaced manner the two ends of the brake band in such a way that in the braking position the control lever which assumes a stable initial position due to stabilizing devices can be moved into an angular position with the simultaneous position change of the two brake band articulation points with respect to one another and the application of the brake band to the brake drum.

According to another embodiment of the invention, the rotatably mounted operating lever pivoted in the casing of the chain saw is pivotable as a lever-like device by means of a control bolt with an operating lever of a toggle lever system comprising the control lever and a release lever whose free end is held in a guide, said control bolt being guided in an elongated hole of the control lever, to whose free end is articulated in rotary manner the end of the brake band and whose other end is rotatably fixed to the control lever at a distance from the articulation point of the other brake band and which is connected to the release lever in such a way that in the inoperative position, the toggle lever system formed by the two levers is movable beyond the extended lever position against a limiting means fixed to the casing and in the braking position is movable into an angular position in the case of a simultaneous reciprocal position change of the two articulation points for the brake band.

The invention also relates to a further construction of a braking mechanism for braking the chain of a portable power chain saw of the type defined hereinbefore, wherein the rotatably mounted operating lever in the casing of the chain saw is pivotable with an operating lever by means of a control bolt guided in an elongated hole of the control lever, to whose one free end is rotatably articulated one end of the brake band, whose other end is rotatably fixed to the control lever at a distance from the articulation point of the other brake band end and whose other end is rotatably mounted on the casing, whereby a portion thereof is extended beyond the articulation point, which is articulated to a U-shaped, downwardly open bow by means of its one end, whilst its other end is under the action of a torsion spring and in the inoperative position the spring-operated bow can be pressed against a limiting means fixed to the casing, whilst in the braking position the control lever and the box can be transferred into an angular position, accompanied by a displaced position of the two articulation points for the brake band relative to one another on the control lever.

According to the invention, a construction of the braking mechanism is provided wherein the operating lever rotatably mounted in the casing of the chain saw is constructed as a bent lever, the free end of the bent lever arm being articulated to a fixed bolt guided in an elongated hole of the lever arm and its operating lever being pivotably connected by means of a control bolt guided by its one end in an elongated hole in the terminal area of the operating lever and with its other end in an elongated hole approximately in the connecting region of the two lever arms of the bent lever-like operating lever, wherein the elongated hole for the control bolt having in the operating lever in the longitudinal direction of the lever arm an upper portion and a lower portion facing the articulation point of the control lever and displaced with respect to the upper elongated hole portion, wherein to the other free end of the control lever is rotatably articulated one end of the brake band, whose other end is rotatably fixed to the control lever at a distance from the articulation point of the other brake band end and wherein the control lever is connected to the operating lever in such a way that in the inoperative position of the spring-operated control lever which assumes an approximately horizontal position, the control bolt comes to rest in the upper elongated hole portion, whilst in the braking position and with the control lever in an angular position it comes to rest in the lower elongated hole portion.

A braking mechanism constructed in this way ensures a completely satisfactory braking of the chains of portable power chain saws if a hazardous state occurs. When using a toggle lever system or two toggle lever-like parts with the fixing of the two ends of the brake band to the control lever, the brake band is applied to the coupling drum by the friction produced in carrying out a braking process. As a result of this friction, an additional tensile force is produced by the brake band and this leads in turn to an increased contact pressure. As a result of this process, the brake band is tightened without any external force action. Due to the fact that in the inoperative state of the braking mechanism, the toggle lever system is guided over the zero point against the fixed limiting means on the casing it is not possible for an automatic release of the braking mechanism if vibrations and shocks of the type occurring in normal operation of the saw occur. Furthermore, the use of a toggle lever system in no way leads to a danger of a delay in the response of the braking mechanism, so that maximum protection for the saw operator is ensured because on operating the mechanism it immediately responds.

Further advantageous embodiments of the invention can be gathered from the subclaims.

BRIEF DESCRIPTION OF THE DRAWINGS

The invention is described in greater detail hereinafter relative to non-limitative embodiments and the attached drawings, wherein show:

FIG. 1 a side view of a braking mechamism having a toggle lever system cooperating with the brake band of a band brake.

FIG. 2 a partial view from above of the braking mechanism.

FIG. 5 another embodiment of a braking mechanism with a control lever connected by means of a spring-operated bow cooperating with the brake band of the band brake in a side view.

FIG. 6 a view from above of the bow of the control lever of the braking mechanism of FIG. 5.

DETAILED DESCRIPTION OF THE PREFERRED EMBODIMENTS

Figure 3:
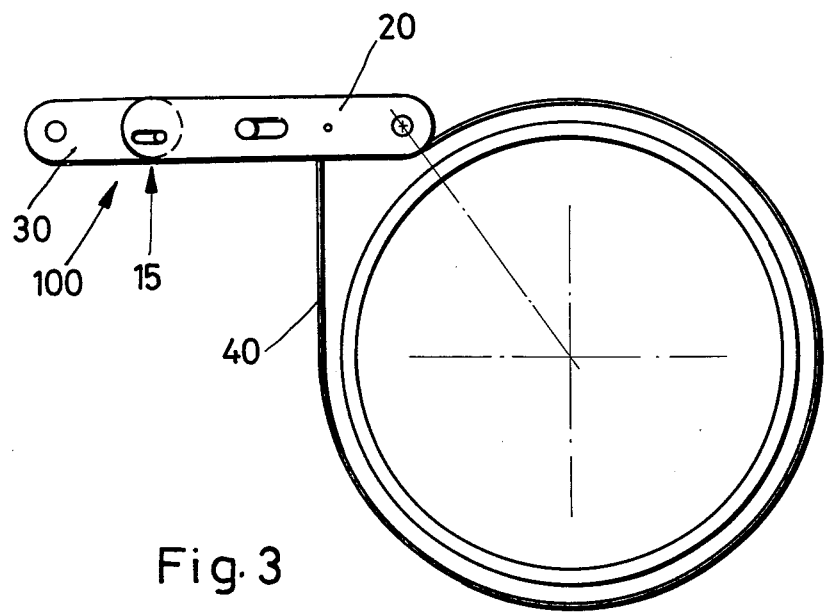
FIG. 3 a diagrammatic side view of the braking mechanism in the inoperative position.

In the embodiment of FIGS. 1 and 2, the casing of a chain saw constructed in per se known manner is indicated at 11. The chain saw is provided with a braking mechanism for braking the chain.

This braking mechanism fundamentally comprises three parts, namely a control lever 20, a release lever 30 connected thereto and a brake band 40 of a per se known band brake, whose brake drum is indicated at 43. Control lever 20 and release lever 30 form the levers of a toggle lever system 100. The operation of the braking mechanism is effected by means of an operating lever 12 pivotably mounted on casing 11. The connection between release lever 30 and operating lever 12 is such that after releasing the brake the primary braking system is freely movable and without any further influence on the part of the operating lever 12. The braking mechanism is released by means of the said operating lever 12.

Operating lever 12 is connected by means of a control bolt 13 to control lever 20. For receiving and guiding bolt 13, control lever 20 has an elongated hole 23 running in the longitudinal direction of lever 20. The free end of control lever 20 is indicated at 21 and the other end thereof which is connected to release lever 30 is indicated at 22.

The two ends 41, 42 of brake band 40 are articulated to the free end 21 of control lever 20. Of the two ends 41, 42 of brake band 40, end 41 is rotatably fixed in the terminal region 21 of control lever 20 to a bolt which is fixed to said lever 20 and this bolt simultaneously forms the articulation point 25. The other end 42 of brake band 40 is rotatably fixed to a bolt 26 arranged on control lever 20 adjacent to the articulation point 25 for brake band end 41 and said bolt 26 simultaneously forms the articulation point for end 42 on control lever 20. Articulation point 26 is provided between articulation point 25 and elongated hole 23 for control bolt 13 on control lever 20.

The free end 31 of release lever 30 of toggle lever system 100 is held and guided in a guide 35, whilst the other end 32 of lever 30 is connected by means of a connecting bolt 37 to end 22 of control lever 20. Connecting bolt 37 fixed to release lever 30 is held and guided in an elongated hole 47 constructed in the terminal region 22 of control lever 20. A tension spring 50, shown only in part and schematically, is fixed to the free end 31 of release lever 30 and to the free end 21 of control lever 20 and prevents rattling of the toggle lever system and an unintentional release. When toggle lever system 100 is inoperative, release lever 30 rests on limiting means 15 fixed to casing 11 and which can be constructed as a resilient elastic member, e.g. of rubber. The limiting means 15 is arranged in such a way that release lever 30 only comes in contact therewith if the toggle lever system is moved beyond the zero point into the limiting means 15, i.e. the two levers 20 and 30 are moved beyond their extended position in the direction of limiting means 15 (FIGS. 1 and 3).

In the case of the embodiments of FIGS. 1 and 2, operating lever 12 is constructed as a bent lever with a longer lever arm 16 and a shorter lever arm 17. Control bolt 13 for the toggle lever system 100 is provided roughly in the connecting area 18 of the two lever arms 16 and 17. The shorter lever arm 17 of operating lever 12 is provided with the guide 35 for release lever 30. Guide 35 for release lever 30 is preferably constructed as a guidance slot 35a on the end of the shorter lever arm 17 of operating lever 12. The end 31 of release lever 30 guided in said guidance slot 35a is provided with a circular guidance surface 31a. When the toggle lever system 100 is in the inoperative position the free end 31 of release lever 30 assumes the position indicated at A in FIG. 1, whilst B indicates the position of the free end of lever 30 when the toggle lever system 100 is in the braking position.

Brake band 40 is preferably guided in a guide indicated at 44 in part of the circumferential area of drum 43 (FIGS. 1 and 5).

A braking mechanism constructed in this way functions as follows. The braking mechanism is released, that is, it is made effective by engaging the brake band with the brake drum, by a movement of operating lever 12 in the direction of arrow X (FIG. 1). In order to return the braking mechanism to the initial position after braking has taken place, operating lever 12 is moved in the direction of arrow X1. The toggle lever system 100 thereby passes beyond the zero point, i.e. beyond the extended lever position and strikes the limiting means 15 (FIG. 3). The running-on end 42 of brake band 40 is articulated to the end 21 of control lever 20 and 26, whilst its running-off end 41 is articulated to control lever 20 at 25. Brake band 40 is rotatable both in articulation point 25 and in articulation point 26. Brake band 40 is held at a uniform distance from coupling drum 43 in the receiving casing 11 by means of guidance ribs which are not shown in the drawings.

Figure 4:
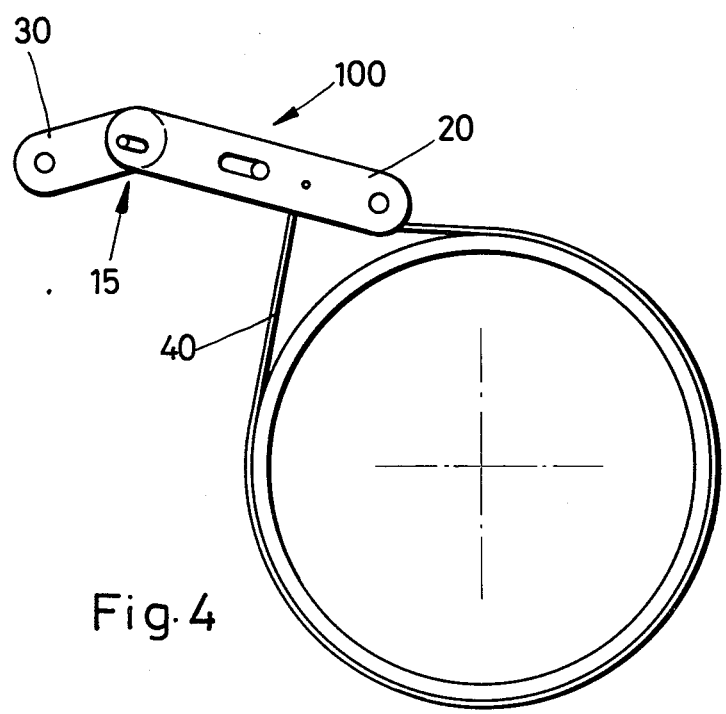
FIG. 4 a diagrammatic side view of the braking mechanism in the braking position.

Following release through the movement of operating lever 12 in the direction of arrow X, the control lever 20 of toggle lever system 100 moves in the direction towards coupling drum 43 that is, the control lever pivots, note FIG. 4 as compared to FIG. 3, with the end 21 of the control lever 20 moving towards the coupling drum 43. As a result, a friction torque is formed at point Y1 between brake band 40 and coupling drum 43. Simultaneously, the control lever 20 moves in the direction of the bearing point, i.e. to control bolt 13. It is necessary for control lever 20 to have a displaceable bearing in the vicinity of control bolt 13. Due to the friction at point Y1 the brake band is engaged with the coupling drum. This friction also produces an additional tensile force at point Y through the brake band and in turn this leads to an increased contact pressure at point Y1. This leads to the automatic tightening of brake band 40 without any external force action. As a function of the machine, the servo action can be adjusted by the setting angle of the control lever 20 with respect to the coupling drum.

The two brake band ends 41, 42 are articulated at the articulation points 25, 26 of control lever 20 in such a way that when toggle lever system 100 is in the braking position, the latter is moved into an angular position, with a simultaneously displaced position of the two articulation points 25, 26 with respect to one another (FIG. 4). Therefore, articulation point 25 of brake band end 41 on control lever 20 is displaced by an angle of approximately 35° to the vertical radius 45 or 145 of brake drum 43 on the drum circumference, as indicated in FIGS. 1 and 5.

In the embodiment of a braking mechanism shown in FIGS. 5 and 6, the aforementioned toggle lever system 100 is replaced by a system comprising a control lever 120 and a U-shaped bow 130 articulated thereto. In this embodiment, the operating lever rotatably mounted in the chain saw casing 11 is pivotable with control lever 120 by means of a control bolt 113 guided in an elongated hole 123 of control lever 120. At the free end 121 of control lever 120, one end 41 of brake band 40 is rotatably articulated at 125, whilst its other end 42 is rotatably fixed to control lever 120 at 126 at a distance from the articulation point 125 of the other brake band end 41. Here again, the two brake band ends 41, 42 are articulated in the same way as in the embodiment described with reference to FIGS. 1 and 2.

In the vicinity of its other end 122, control lever 120 is pivoted on a pivot pin 127 fixed to casing 11. Control lever 120 is extended beyond articulation point 127. This portion is indicated at 122a. The U-shaped bow 130, whose two legs are designated 131 and 132, is pivotably articulated to portion 122a. The free end of leg 132 of bow 130 is rotatably fixed to control lever 120 at 135. Bow 130 is arranged in such a way that the bow opening is downwardly directed. To the other leg end 131 of bow 130 is directly connected a torsion spring 160, whose free leg 161 is fixed to casing 11 (FIGS. 5 and 6). A limiting means 115 is fixed below the fulcrum or articulation point 127 of control lever 120. This limiting means 115 can also be constructed in a resilient elastic manner. In the inoperative position of the system shown in FIG. 5, control lever 120 over bow 130 is forced against the limiting means 115 by means of torsion spring 160. In the braking position, i.e. in the case of a corresponding operation of operating lever 12, control lever 120 is transferred into an inclined position, corresponding to the braking position shown in FIG. 4, counter to the spring tension. On the basis of this position of control lever 120, braking of the brake drum takes place, whereby it is in operative connection with the driving sprocket of the saw chain not shown in the drawing.

Figure 7:
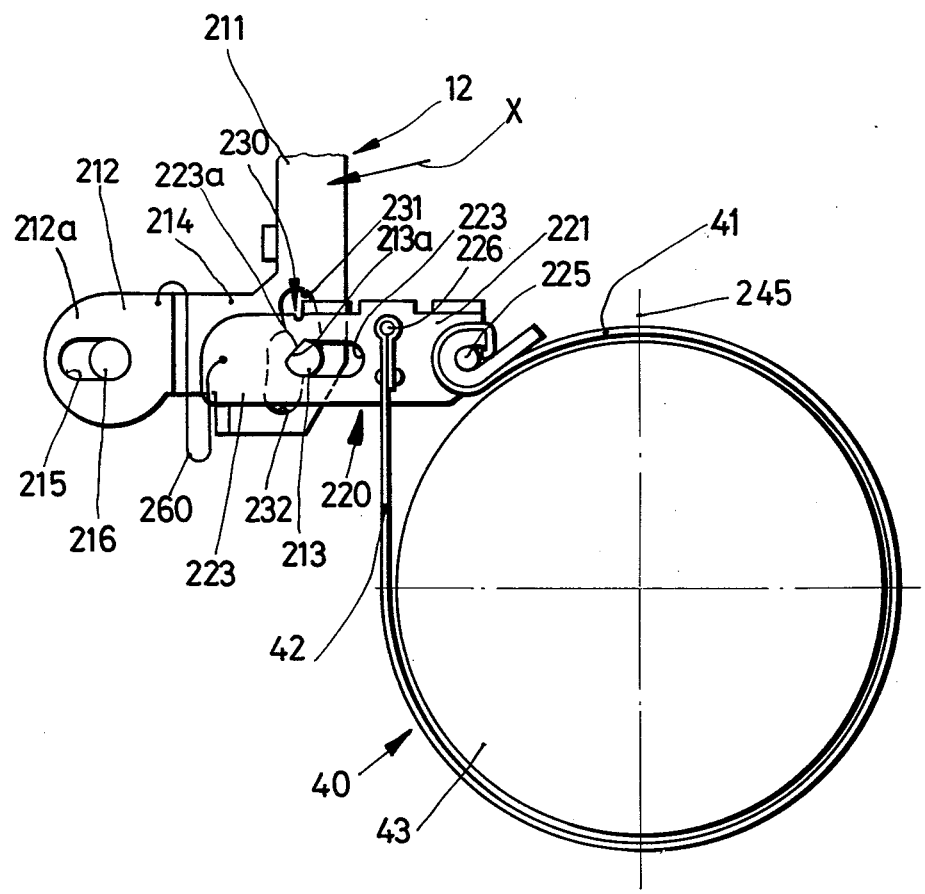
FIG. 7 a side view of another embodiment of a braking mechanism.
Figure 8:
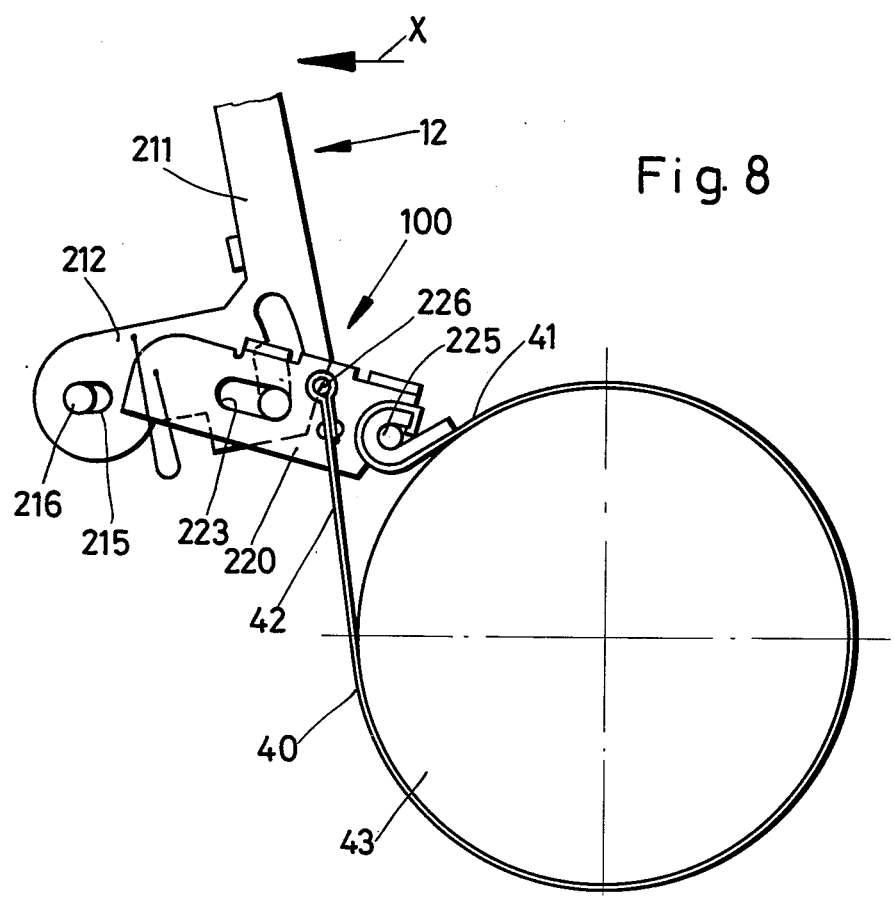
FIG. 8 a diagrammatic side view of the braking mechanism of FIG. 7 in the braking position.
Figure 9:
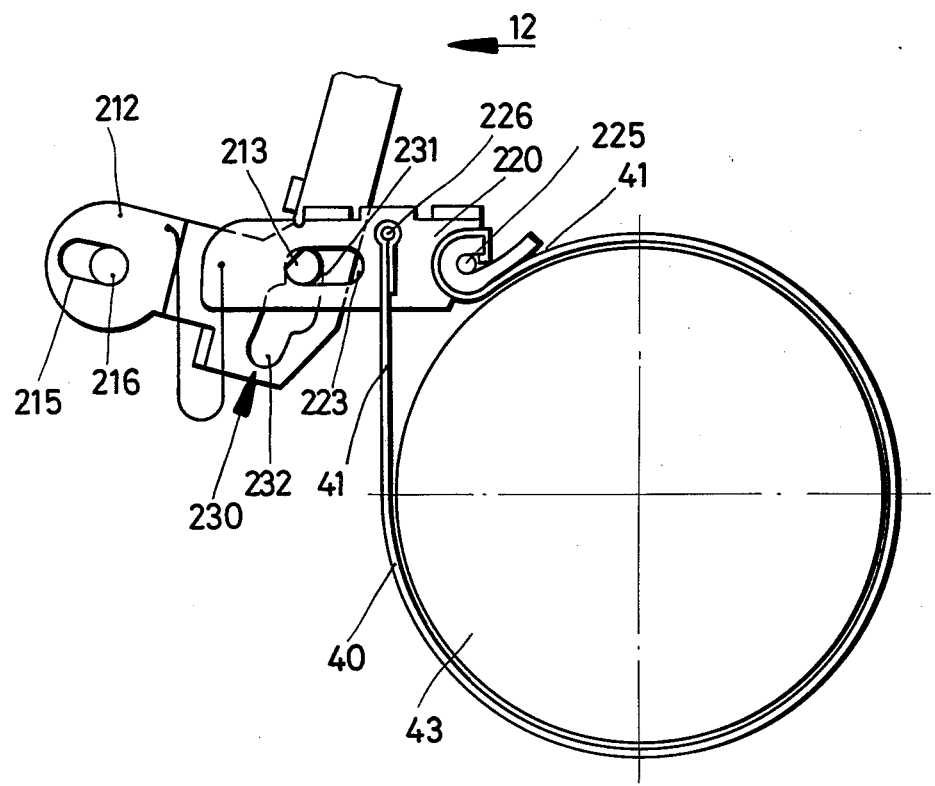
FIG. 9 a diagrammatic side view of the braking mechanism of FIG. 7 in the inoperative position.

In the embodiment of a braking mechanism shown in FIGS. 7 to 9, the operating lever 12 rotatably mounted in the chain saw casing 11 is constructed as a bent lever with a longer lever arm 211 and a shorter lever arm 212. By means of its shorter lever arm 212, lever 12 is rotatably mounted about a bolt 216, which is fixed to casing 11 and simultaneously forms the articulation point for operating lever 12. Bolt 216 is guided in an elongated hole 215 in the terminal region 212a of lever arm 212 of lever 12. This elongated hole 215 is approximately parallel to the longitudinal axis of lever arm 212 (FIG. 7).

In the manner of a toggle lever system, operating lever 12 is in operative connection with control lever 220, which is articulated by means of a control bolt 213 to operating lever 12. One end of control bolt 213 is guided in an elongated hole 223 in the terminal region 222 of control lever 220. Elongated hole 223 is formed in the control lever and is directed approximately parallel to the longitudinal axis of said lever. In the vicinity of end 222 of control lever 220, elongated hole 223 has a bevelled surface indicated at 223a. Control bolt 213 is provided with a bevelled opposite surface 213a. If the braking mechanism is in the inoperative position shown in FIG. 9, the bevelled surface 213a of control bolt 213 acts on the bevelled surface 223a of elongated hole 223 in control lever 220. The other end of control bolt 213 is guided in an elongated hole 230 formed in operating lever 12 in the connecting area 214 between lever arm 211 and lever arm 212 thereof. Elongated hole 230, which runs approximately parallel to the longitudinal axis of the longer lever arm 211, has two displaced guide portions and namely an upper portion 231 and a lower portion 232 which is laterally displaced with respect to the upper portion 231. If the braking mechanism assumes the inoperative position shown in FIG. 9, then control bolt 213 is located in the upper elongated hole portion 231, whilst in the braking position bolt 213 is located in the lower elongated hole portion 232 (FIG. 8).

One end 41 of brake band 40 is rotatably articulated at 225 to the free end 221 of control lever 220. Its other end 42 is rotatably fixed to control lever 220 at 226 at a distance from the articulation point 225 of the other brake band end 41. In the embodiment of FIG. 7, there is also an articulation of the two brake band ends 41, 42 in the same way as described hereinbefore with respect to the embodiments of FIGS. 1, 2 and 5, 6.

In addition, the free end 222 of control lever 220 is connected to a fastening spring 260, whose other end is fixed to end 212a of lever arm 212 of operating lever 12.

The braking mechanism shown in FIGS. 7 to 9 operates as follows. In the inoperative position, control lever 220 assumes an approximately horizontal position, control bolt 213 being located in the left-hand portion of elongated hole 223 and in the vicinity of the upper portion 231 of elongated hole 230. Control lever 220 is held in this inoperative position by means of spring 260 (FIG. 9).

If the braking mechanism is released through a movement of operating lever 12 in the direction of arrow X (FIG. 8), as a result of the pivotal movement of operating lever 12, control lever 220 is pivoted into the position shown in FIG. 8 as a result of control bolt 213 being forcibly guided from the upper elongated hole portion 231 into the lower elongated hole portion 232. As a result, operating lever 12 and control lever 220 assume an angular position with respect to one another, as a result of which brake band 40 engages on brake drum 43 and braking takes place by friction.

Advantageously, articulation points 25, 26 125, 126 and 225, 226 of brake band 41 at the end of control lever 220 are displaced from one another in such a way that articulation point 26 or 126 or 226 of brake band end 42 is positioned above the other articulation point 25 or 125 or 225 of the other brake band end 41, so that even with a limited angular position of control lever 20 or 120 or 220 a considerable braking force is obtained.

What is claimed is:

1. A braking mechanism for braking the chain of a portable power chain saw comprising a friction brake including a drum arranged to be connected to the driving sprocket of the chain and a brake band selectively engageable with said drum, said brake band having a pair of ends, a sensor which responds when a hazardous-state occurs and comprising a pivotable operating lever arranged to be mounted on a chain saw casing and said operating lever can come into contact with one hand of the saw operator in the case of a swinging movement of the saw and by the movement of said operating lever it is possible to operate said friction brake in operative connection with said operating lever, a lever-like device is connected to said operating lever, said lever-like device comprises a control lever having a first end and a second end, the two ends of said brake band are rotatably articulated to said first end of said control lever with said two ends of said brake band located in spaced relation on said first end of said control lever, stabilizing means in engagement with said control lever for maintaining said control lever in a stable initial position, and said control lever can be moved into an angular position with the simultaneous position change of the two brake band ends articulation points with respect to said brake drum and the application of the brake band to the brake drum, said operating lever pivoted in the casing of the chain saw includes a first control bolt in pivotal engagement with said control lever forming part of a toggle lever system so that said operating lever can be pivoted with said lever-like device, and the toggle lever system including said control lever and a release lever having a free end and an engagement end, a guide for holding the free end of said release lever, said control lever having an elongated hole and said first control bolt being guided in the elongated hole of said control lever, the engagement end of said release lever is rotatably fixed to said control lever at a distance from the points where the brake band ends are connected to said control lever and said control lever is connected to the release lever in such a way that in the inoperative position, the toggle lever system formed by the two levers is movable from an extended aligned lever position against said stabilizing means to a braking position in which the two levers are in an angular position relative to one another where a position change of the two connection points of the ends of the brake band to said control lever takes place.

2. A braking mechanism according to claim 1, wherein said operating lever is constructed as a bent lever with a longer lever arm and a shorter lever arm extending angularly relative to one another and having an intersection area the first control bolt for the toggle lever system is located in the intersection area of said lever arms and said shorter lever arm forms said guide for the free end of the release lever.

3. A braking mechanism according to claim 2, wherein said guide for said release lever is a guidance slot and the free end of said release lever guided in said slot has a circular guidance surface.

4. A braking mechanism according to claim 1, wherein a second bolt connects said release lever to said control lever, with said release lever having the free end and the engagement end and the engagement end of said release lever is connected by said second bolt to the second end of said control lever, one of said release lever and control lever has an elongated hole therein, and said second bolt is connected to the other one of said release lever and control lever and said second bolt is guided in said elongated hole.

5. A braking mechanism according to claim 1, wherein said release lever having the free end and the engagement end with the engagement end of said release lever connected to the second end of said control lever and said stabilizing means comprises a tension spring connecting the free end of said release lever to the first end of the control lever.

* * * * *